Sept. 27, 1949.  H. P. DEYARMOND  2,483,336
SAW RETOOTHER AND METAL CUTTER
Filed Dec. 22, 1945  3 Sheets-Sheet 1

INVENTOR.
HERBERT P. DEYARMOND,
BY
Westall & Westall
ATTORNEYS.

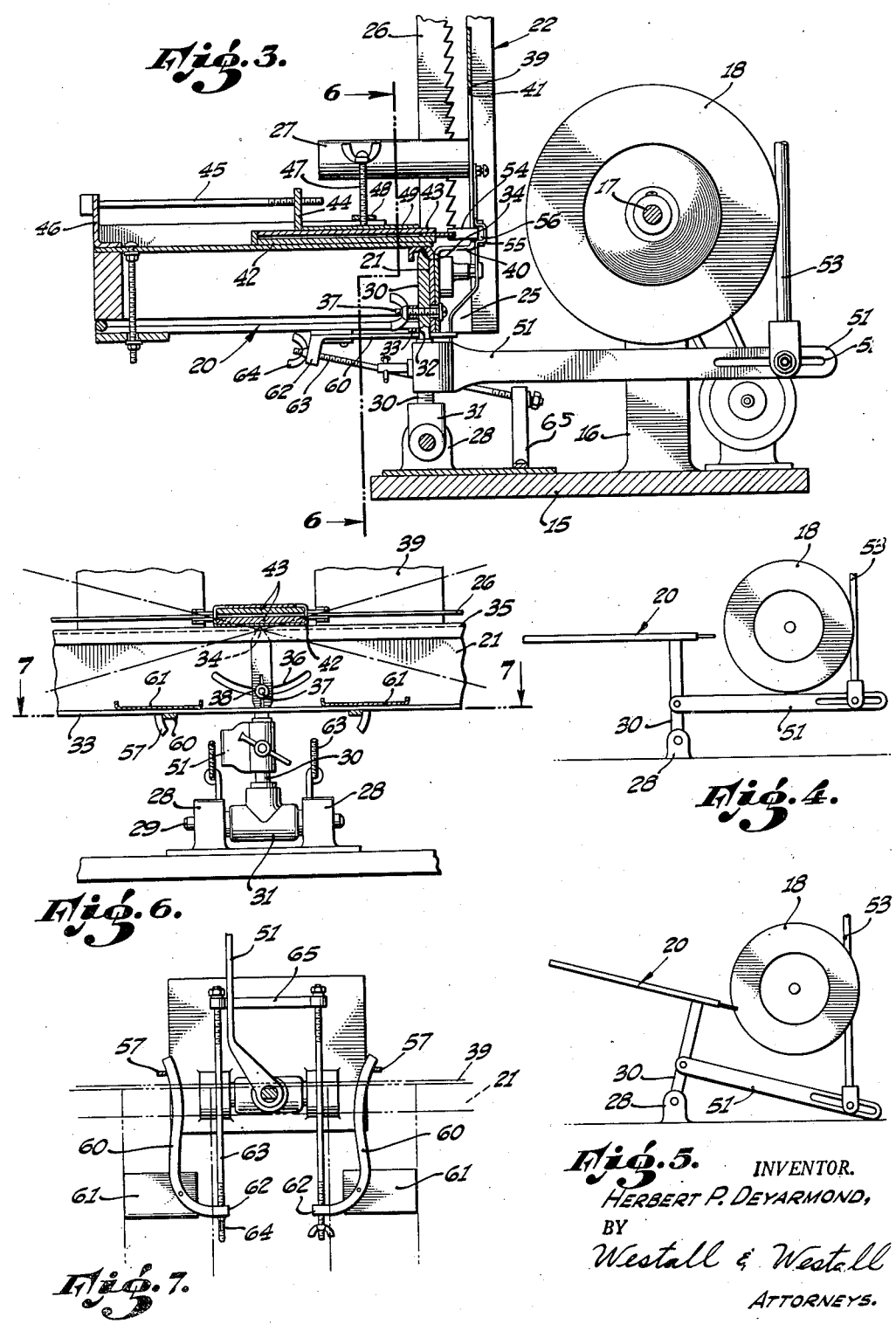

Sept. 27, 1949.  H. P. DEYARMOND  2,483,336
SAW RETOOTHER AND METAL CUTTER

Filed Dec. 22, 1945  3 Sheets-Sheet 3

INVENTOR.
HERBERT P. DEYARMOND,
BY
Westall & Westall
ATTORNEY.

Patented Sept. 27, 1949

2,483,336

UNITED STATES PATENT OFFICE 2,483,336

SAW RETOOTHER AND METAL CUTTER

Herbert P. Deyarmond, Los Angeles, Calif.

Application December 22, 1945, Serial No. 636,978

7 Claims. (Cl. 76—42)

This invention relates generally to saw re-toothers and metal cutters, contemplating more specifically apparatus for supporting saws and metal shapes such as rod, bar, tubing and the like, in variable relation with a rotary grinding or cutting wheel by which the work may be sharpened, severed, or otherwise re-formed.

A principal object of the present invention is to provide a bed for supporting a saw or other work in a predetermined plane transverse to a grinding element in combination with means for progressively advancing the work in said plane while permitting intermittent contact of the work with the grinding element.

More specifically, an object is the provision of a sliding table for the support of a saw or the like carried by a bed pivotally mounted for movement in the plane of an adjacent grinding wheel and tiltable for arcuate movement in a plane forming a right angle with respect to the wheel, whereby the teeth of the saw may be shifted into contact with the grinding wheel at any predetermined angle for sharpening opposing sides of adjoining teeth while maintaining the angularity of the bezel.

Another object is to provide apparatus adapted for actuation by an auxiliary power unit for intermittently moving a saw blade, supported at a variable angle, across the plane of a grinding wheel to successively align the respective teeth thereof with the wheel and, alternately, to progressively shift each tooth so aligned with the wheel for sharpening.

Another object is to provide a rotatable grinding or cutting wheel in combination with a laterally-movable support for shifting the teeth of a saw blade or other work to be sharpened or cut into contact with an arc of the wheel at a level below the horizontal diameter of the wheel, the latter being rotatable in a downward direction at the point of contact, permitting the wheel to cut cooler and reducing wear to an extent which enables a wheel to last several times as long as otherwise possible.

Numerous other objects and salient features of my invention, such, for example, as relative simplicity of construction, economy of manufacture, positive control of the work at all times which assures uniformity of results within fine tolerances, and adjustability of the mechanism to accommodate saws of all types and of various sizes, will be apparent to those of skill in the art upon an examination of the following description read in the light of the accompanying drawings, in which:

Fig. 3 is a transverse sectional view taken on lines 3—3 of Fig. 2 through the saw-supporting mechanism, and illustrating the grinding wheel in elevation;

Figs. 4 and 5 are diagrammatic views showing the relation between the grinding wheel and the saw at opposite extreme positions of the work-supporting bed;

Fig. 6 is a fragmentary sectional view taken on lines 6—6 of Fig. 3 of the pivotal mounting for the work-supporting bed, the dotted lines indicating the extreme positions to which the frame may be tilted for supporting the work at different angles relative to the grinding wheel;

Fig. 7 is a sectional view taken on line 7—7 of Fig. 6, illustrating the lever mechanism through which the movements of the bed are effected and controlled;

Figure 1:
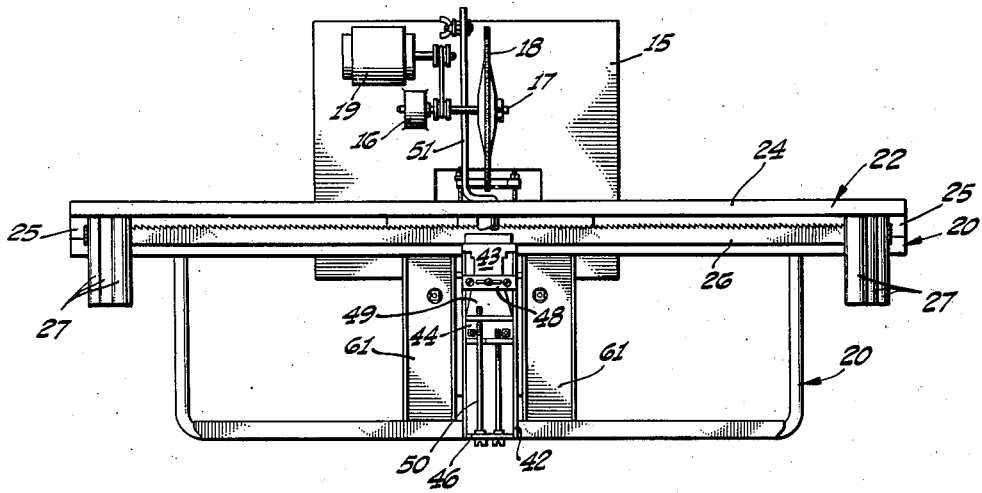
Fig. 1 is a plan view of an assembly embodying my invention, illustrating its use in re-toothing a band saw partially broken away.

Referring to the drawings more in detail, the numerals of which indicate similar parts throughout the several views, 15 designates a supporting base upon which a standard 16 is mounted. A shaft 17 journalled in the upper end of standard 16 carries a grinding or cutting wheel 18 of carborundum or other abrasive material, into contact with which the work to be sharpened or cut is moved in accordance with the operation of my invention as will appear. 19 indicates a motor carried by base 15 and operatively connected by suitable means well known in the art to shaft 17 to drive the cutting or grinding wheel 18 at high speed. It will be observed that shaft 17 upon which wheel 18 is mounted is supported at only one end to facilitate substitution of wheels of different types or sizes when occasion demands.

The work is carried by a tiltable bed 20 generally rectangular in cross-section. One side of bed 20 comprising a channel 21 is extended at either end to provide a mounting for a band saw frame-support 22 comprising a pair of uprights 23 secured rigidly to the ends, respectively, of channel 21 of the bed, and a cross-beam 24 connecting the upper ends of uprights 23. The band saw support 22 is spaced rearwardly from channel 21 in order to provide sufficient clearance for the work on the bed 20 by a pair of blocks 25 interposed between the lower ends of uprights 23 and channel 21 of the supporting bed.

Figure 2:
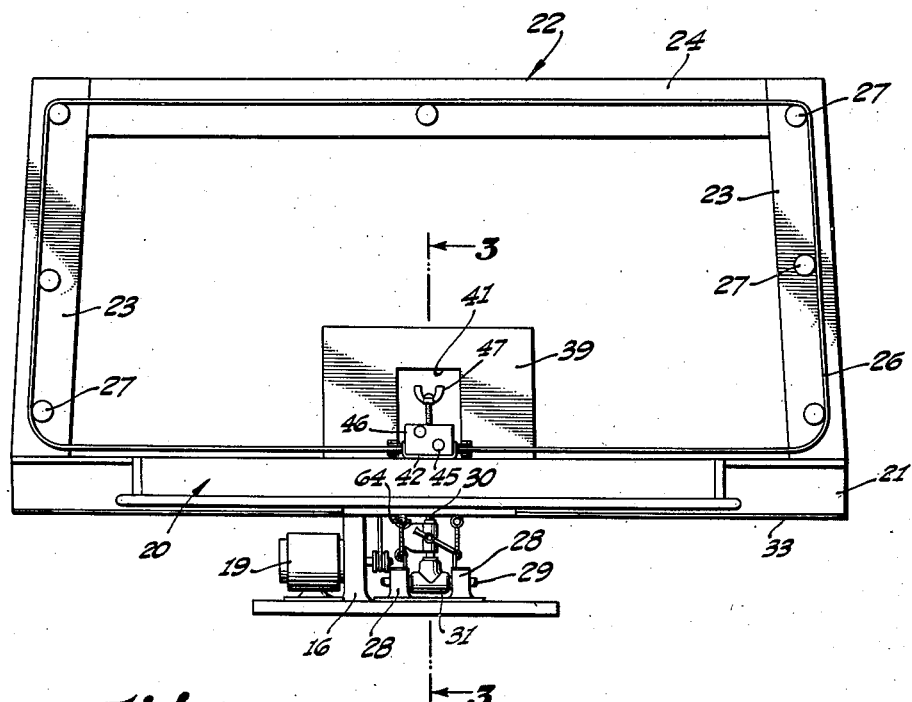
Fig. 2 is a front elevation of the apparatus depicted in Fig. 1.

As will be apparent from an examination of Figs. 1 to 8, I have illustrated the principal structure of my invention as it is employed to accomplish the re-toothing or sharpening of a band saw blade 26, which as seen most clearly in Fig. 2 is adapted to be suspended from a plurality of laterally-projecting pegs 27 carried by the vertically-disposed frame 22. The working reach of band saw 26 overlies channel 21 of the normally horizontal bed 20.

The supporting structure for bed 20 comprises a pair of pillow blocks 28 mounted in spaced relation upon base 15. Pillow blocks 28 provide rotatable support for the ends of a short sectional shaft 29. An upright supporting bar 30 intersects and is rigidly secured to shaft 29 by a suitable T-fitting 31. Bar 30 projects upwardly through a slot 32 in a lower flange 33 of channel 21 of bed 20 and terminates at its upper end in a point which engages in a small depression or opening 34 in the upper flange 35 of channel 21. The intermediate reach of the upper end of bar 30 is thus maintained in contiguous relation with the web of channel 21 which is formed with a slot 36 in the form of an arc having its center on the pointed upper end of bar 30. A bolt 37, equipped with a winged nut 38, extends through slot 36 and bar 30 to clamp the bed and bar rigidly together. It will thus be observed that the winged nut 38 loosened the bed may be tilted in the vertical plane of bar 30 and channel 21 in either direction from the horizontal upon a center point coinciding with the upper end of the bar, and, further, that bed 20 may be secured in its preadjusted angular position.

A shield 39 is secured to the back of channel 21, and at a level coinciding with the plane of the upper flange 35 of channel 21 is bent rearwardly at a right angle a short distance, and then upwardly, the lateral offset 40 providing additional clearance for saw blade 26 which extends in parallel relation immediately thereabove. Shield 39 is of a height sufficient to protect the operator, who stands at the side of the bed opposite to that at which grinding wheel 18 is located, against cuttings from the wheel and the work. A rectangular opening 41 in shield 39 permits the movement of blade 26 into contact with the grinding wheel in response to the tilting of bed-supporting mechanism in the pillow blocks 28.

The working reach of saw blade 26, i. e., that portion of the blade which overlies the upper flange 35 of channel 21 and lateral offset of shield 39, is frictionally held against lateral displacement during this operation by means of a clamping assembly comprising a short channel 42 superimposed in transverse relation upon bed 20 and secured thereto at each end by bolts. A pair of clamping jaws 43, composed of resilient material, is accommodated within channel 42 so as to project from the end of the latter adjacent shield 39. The opposite ends of jaws 43 are both bolted to a traveling angle 44, an upstanding flange of which is adapted to receive the threaded end of an actuating screw 45. The opposite end of screw 45 projects rotatably through and is retained against longitudinal displacement in an angle 46 rigidly secured in the opposite end of channel 42. It will accordingly be observed that by rotation of screw 45 the clamping jaws 43 may be shifted forwardly or rearwardly in channel 42 with respect to shield 39, so as to determine the lateral disposition of the working reach of a blade clamped between jaws 43. The tenacity of the grip by the clamping jaws upon the blade may be varied by means of a thumb screw 47 threaded through a bridge 48 secured over the top of channel 42 and overlying a clevis 49 superimposed upon the upper jaw 43. By threading thumb screw 47 down upon the clevis 49, the jaws 43 are compressed against the bottom of channel 42 so as to vary the pressure of the jaws upon the saw blade. The forward end of clevis 49 overhangs the sides of clamping jaws 43 to engage the back of saw blade 26 and thereby reinforces the position of the blade with respect to shield 39. Clevis 49 is formed with an upstanding flange at its rearward end for the engagement of a screw 50 similar to screw 45 by which clevis 49 may be shifted relative to the end of clamping jaws 43. Thus the position of the lateral support for the blade afforded by the clevis may be varied to adjust the position of the working reach of the blade and adapt the clamping assembly to blades of different width.

The bed 20, saw frame 22, and clamping assembly, supported on the upper end of bar 30, are tilted rearwardly by means of a reciprocating drive, about to be described, to a degree which causes the forward arc of grinding wheel 18 to project through the opening 41 in the shield 39 and engage the tooth of the saw aligned therewith. An actuating bar 51 is rigidly secured to the shank of the supporting bar 30 below bed 20 and extends rearwardly adjacent and parallel to the plane of the grinding wheel. The rearward end of actuating bar 51 is longitudinally slotted as at 52 for the pivotal connection therewith of a pitman 53, adapted to be connected to a crank shaft rotated through reduction gearing by a motor (which elements, being conventional, are not illustrated) so as to vertically reciprocate the actuating bar 51, as will be obvious. Due to the rigid right-angular relation between actuating bar 51 and the supporting bar 30 and the maintenance of the supporting bar in a vertical plane parallel with grinding wheel 18, bed 20 and saw carried thereby are shifted toward and away from the grinding wheel with each cycle of operation of pitman 53.

Figure 8:
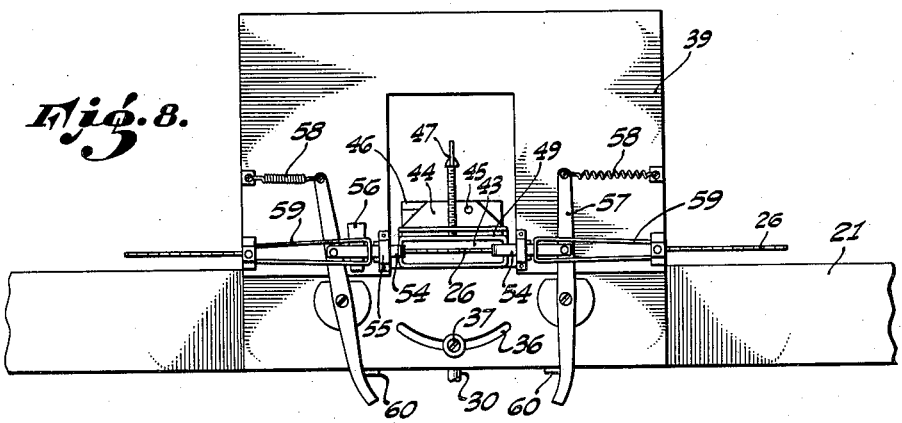
Fig. 8 is a fragmentary view in rear elevation of the supporting bed, and showing particularly the mechanism for controlling the longitudinal movement of a saw blade.

As hereinabove generally indicated, the saw blade 26 is adapted to be shifted longitudinally with each cycle of operation of actuating bar 51 to an extent sufficient to critically align the next succeeding tooth of the saw with grinding wheel 18. Mechanism is therefore included to compel this movement of the saw progressively in either direction. To this end I provide a pair of dogs 54 which are reciprocable in the plane of the blade 26 through guides 55 secured to the back of shield 39 at opposite sides of opening 41. Each dog 54 is curved to extend through opening 41 and to normally engage a tooth of blade 26 to be subsequently aligned with the grinding wheel. With a dog 54 engaged with a tooth of blade 26, forward motion thereof, i. e. farther into opening 41, will accordingly shift the saw blade in a corresponding direction. Thus it will be observed that dogs 54 operate in opposition to one another. Accordingly, when it is desired that the saw blade be shifted toward the left as seen in Fig. 8, the right-hand dog 54 is utilized, and the dog at the opposite side is rendered inoperative by means of a block 56 interposed between shield 39 and that dog so as to hold the latter out of contact with the saw teeth. Conversely, movement of the blade in an opposite direction may be effected by releasing the left-hand dog 54 and blocking the right-hand dog in retracted position. The guides 55 permit each dog 54 a certain amount of lateral movement sufficient to permit its withdrawal out of contact with the blade when it is to be rendered inoperative.

As the mechanism for reciprocating the respective dogs 54 is identical, it will be understood that the following description of the apparatus for reciprocating the right-hand dog as seen in Fig. 8 also applies to the actuating mechanism for the dog at the opposite side of the opening 41 in shield 39. A lever 57 fulcrumed intermediate its ends to the back of shield 39 directly below the rearward end of dog 54 extends upwardly adjacent the shield and downwardly to a point below the lower flange 33 of channel 21. A helical tension spring 58 connected between the upper end of lever 57 and a lateral point on shield 39 normally holds the lever in tilted position, and dog 54 which is pivoted thereto in a retracted position.

During operation, dog 54 is maintained in contiguous contact with shield 39 throughout its range of reciprocary movement by means of a spring wire 59 doubled upon itself. The ends of wire 59 are clamped to the edge of shield 39 in the horizontal plane of dog 54, and the opposite looped end of the spring is arranged to bear against the outer surface of dog 54 to assure this contiguous relationship between the dog and shield. Lever 57 is adapted to be swung against the tension of spring 58 so as to urge dog 54 into contact with one of the teeth of blade 26 and to move the blade longitudinally therewith by means of a sway bar 60 fulcrumed to the underside of a transverse reinforcing member 61 for bed 20 rearwardly of the saw blade. The opposite end of sway bar 60 is formed with a looped retainer 62 for the extension of a bolt 63 therethrough provided with an adjusting winged nut 64. Bolt 63 extends obliquely downward under channel 21 of bed 20 and to a point intermediate the pillow block assembly 28 and standard 16 by which grinding wheel 18 is supported, the head of bolt 63 being accommodated in a bracket 65 mounted on base 15.

The operation of my invention as illustrated in Figs. 1-8 inclusive in re-toothing a band saw 26 is briefly described as follows: If a flat bezel, i. e., a bezel forming a right angle with the plane of the blade, is to be formed or sharpened, bed 20 is arranged to assume a horizontal position on the upper end of supporting bar 30 and is clamped rigidly to the bar by the bolt 37. The band saw blade 26 is then arranged on pegs 27 of the supporting frame 22 with the lower working reach thereof overlying the upper channel flange 35 and lateral offset 40 of shield 39. The clamping assembly is then secured to bed 20 and the clamping jaws 43 advanced by manipulation of the screw 45 to engage opposite sides of saw blade 26. By manipulation of screw 50 and the thumb nut 47, clamping jaws 43 may be brought into frictional engagement with saw blade 26 and sufficient pressure applied thereto to resist lateral movement of the blade during operation of actuating bar 51 while assuring freedom of longitudinal movement of the blade between jaws 43 in response to actuation of one or the other of dogs 54 against successive teeth of the blade. It will be noted that by proper arrangement of the clamping assembly the blade may be supported in the approximate position required for most facile operation of the blade-shifting mechanism.

The saw blade 26 is thus preliminarily arranged to align one of the teeth with grinding wheel 18. In Fig. 3 bed 20 is shown in its extreme rearward position with the saw out of contact with the grinding wheel, the actuating bar 51 horizontally disposed, and pitman 53 at the top of its stroke. As pitman 53 is lowered in response to the application of power thereto, bed 20 and the saw carried thereby are shifted rearwardly so as to bring the tooth of the blade previously aligned with grinding wheel 18 into contact with the latter which is driven at a high speed by motor 19. During this initial stroke of bed 20 and blade 26, the pressure on the end of sway bar 60 by the nut 64 carried by bolt 63 is relieved, permitting the spring 58 to tilt lever 57 and partially retract dog 54 which, incident to this operation, rides over the adjacent tooth and engages behind the next tooth of the blade. On the upstroke of pitman 53, bed 20 and the saw blade are returned to their original position. This movement of the bed carries the fulcrum of the sway bar 60 rearwardly, and, by reason of the engagement of the end of the sway bar with the nut 64 threaded on the bolt 63, the opposite end of bar 60 is swung against the lower end of lever 57. The upper end of lever 57 is thus tilted against the tension of spring 58, urging the tooth-engaging dog 54 farther into the opening 41 in shield 39. With dog 54 engaged in one of the teeth of the saw, the latter is accordingly shifted longitudinally to an extent determined by the adjustment of the winged nut 64 threaded on bolt 63. It will thus be seen that by varying the adjustment of the winged nut 64, the length of the stroke of dog 54 may be altered to conform with the size of the teeth of the saw being serviced, so as to assure positive and highly critical alignment of the teeth with grinding wheel 18, into contact with which they are successively brought on alternate strokes of operation of pitman 53. In this manner the teeth on the entire band of the saw blade 26 are effectively and uniformly sharpened.

Figure 9:
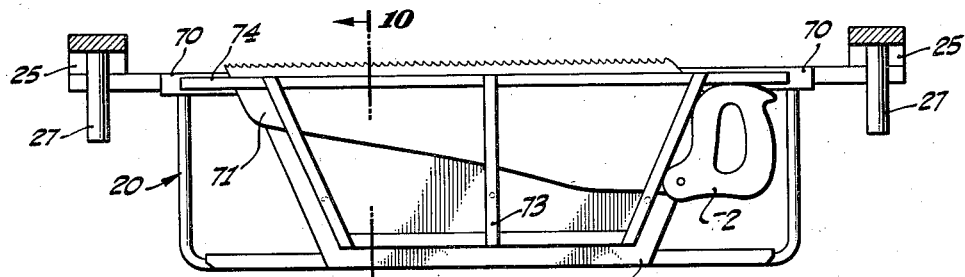
Fig. 9 is a plan view of the sliding table and auxiliary clamp for supporting a carpenter's hand saw in position on the bed for sharpening.
Figure 10:
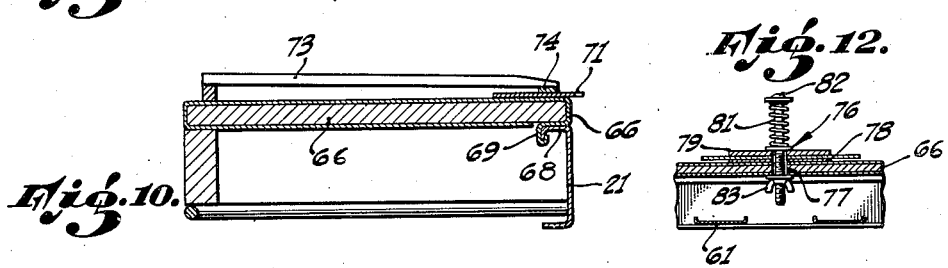
Fig. 10 is a sectional view taken on lines 10—10 of Fig. 9.

As hereinabove indicated, the apparatus is equally well adapted for sharpening or re-toothing carpenters' hand saws and pruning and buck saws. For this purpose a table 66 is slidably supported upon bed 20 (Figs. 9 and 10). The outer side of the bed comprises a channel iron 21 having an upper flange 68 with which a complementary elongated retaining strip 69, integral with the underside of table 66, is engaged so as to prevent lateral misalignment of the table and bed 20 while permitting its movement longitudinally of the bed. The edge of table 66 overlying the inner channel 21 is extended at each end as at 70—70, for a purpose about to be described. A carpenter's saw 71 is illustrated in operative position upon the table, being arranged with its teeth overhanging the table edge for engagement by one or the other of dogs 54 of the saw-shifting mechanism hereinabove described. The handle 72 of saw 71 is accommodated at the end of table 66, the narrow extension 70 being adapted to afford firm support for the edge of the blade adjacent handle 72. Similarly, the extension 70 at the opposite end of table 66 is useful in supporting the edge of the blade in inverted position, which requires that the handle be disposed at the opposite end of the table. Saw 71 is firmly secured in the described position by means of a clamp 73 bolted to table 66 rearwardly of the saw. Clamp 73 corresponds in shape generally to that of the table, and comprises a bar 74 adapted to overlie saw 71 along its entire length directly in back of the teeth, thus performing the dual function of lending rigidity to the edge of the saw blade and transmitting longitudinal movement of the blade to table 66 in response to the urge of dog 54 acting upon the teeth. Engagement of the table with the outer channel 21 of bed 20 prevents lateral movement of the saw during this operation.

It will be appreciated that in this and each of the other embodiments alternate teeth may be sharpened, with table 66 and bed 20 tilted on the supporting bar 30 so as to form an angular bezel on those teeth correspondingly set, and thereafter reverse the saw and produce a bezel at an angle of the same degree upon those teeth set in an opposite direction. In such case the blade-shifting mechanism is adjusted to shift the saw to a degree sufficient to align alternate teeth with grinding wheel 18.

Figure 12:
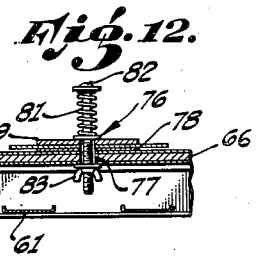
Fig. 12 is a sectional view taken on lines 12—12 of Fig. 11.
Figure 11:
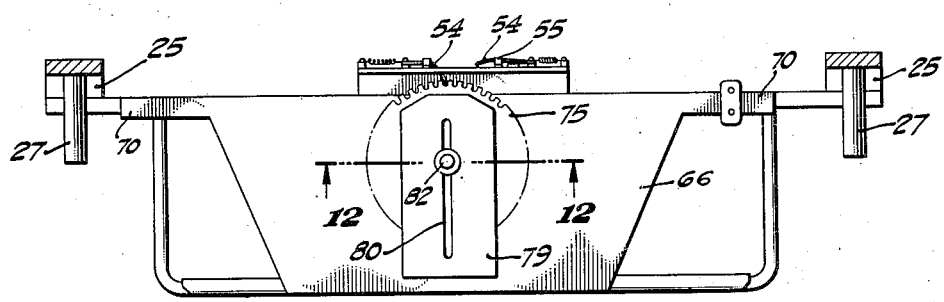
Fig. 11 is a plan view similar to Fig. 9, but illustrating the apparatus for sharpening a circular saw blade.

The use and operation of the apparatus in sharpening a circular saw 75 is illustrated in Figs. 11 and 12. Table 66, utilized to slidably support a carpenter's saw or buck or pruning saw of which the hand saw 71 is illustrative, of the embodiment of Figs. 9 and 10, is employed in re-toothing circular saws, but is held in fixed position depending upon the angle of the teeth of the particular saw to be sharpened, as will be more fully explained, by a clamp 76. Clamp 76 is arranged at either end of table 66 so as to frictionally secure one of the extensions 70—70 to channel 67 of bed 20. Table 66 is formed with a transverse slot 77 equi-distant between the ends of the table to accommodate a resilient clamping assembly about to be described. A circular spacer 78 of smaller diameter than the saw blade to be sharpened is placed upon table 66 and the blade superimposed thereon, whereby spacer 78 supports the teeth of the saw above and out of contact with the table. An adjustable clamping plate 79 having a slot 80 therein is placed upon saw blade 75, and these parts are clamped to table 66 in the described relationship by a nut and bolt assembly extending axially therethrough. A helical spring 81 encircles the bolt 82 above clamping plate 79, and is adapted to be variably compressed against the latter by a winged nut 83 to apply resilient pressure to the assembly and thereby obviate undesired rotation of blade 75 as well as misalignment of the saw or of the clamping plate 79 relative to grinding wheel 18, and saw teeth, respectively. The slot 80 in plate 79 permits the lateral adjustment of the plate whereby one end of the latter may overlie the edge of the saw rearwardly of those teeth which are aligned with grinding wheel 18, regardless of the diameter of the saw. Slot 77 in table 66 permits the entire assembly to be shifted laterally on the table toward or away from shield 39 to obtain the proper relationship between the saw teeth and the actuating dog 54, which it will be observed is operable to intermittently rotate the saw 75 on its axis and align, progressively, the successive teeth of the blade with the grinding wheel. Frictional engagement of the saw blade 75 between the spacer 78 and clamping plate 79 in response to the resilient pressure of spring 81 assures the effectivity of the critical adjustment of the actuating dog 54 in accomplishing this function. The inclination of the teeth of the saw blade, i. e. their angle with respect to the radius of the blade, may be compensated for by positioning the table so as to offset the axis of the saw from the plane of grinding wheel 18, as illustrated in Fig. 11. In this manner the saw is held with the teeth disposed on either side of the plane of the wheel 18 in parallel relation with that plane, thus enabling the effective grinding of both adjacent edges of the respective adjoining teeth.

The apparatus comprising the bed 20 and its supporting and actuating mechanism is also well adapted for cutting metal strips, tubing, rod or bar. In accordance with this use of the equipment, table 66 is removed from bed 20 and the work is supported on the channel 21 of the bed and upon the lateral offset 40 of shield 39 extending across the opening through which grinding wheel 18 is adapted to project incident to shifting the bed toward the wheel. The clamp 76 may be variably mounted upon channel 67 of bed 20 to function as a stop or guide for facilitating the determination of the length of the cut. The angle of the kerf formed by grinding wheel 18 through the work is determined by the adjusted angle at which bed 20 is suported on the supporting bar 30.

It will thus be seen that I have provided power-actuated apparatus adapted for universal utility in sharpening or re-toothing saw blades of any type or size, as well as cutting metal stock, embodying mechanism for intermittently shifting the work into contact with a thin grinding or cutting wheel, the angle between the plane of the wheel and the work being variable to form a bezel or kerf of required contour.

While I have shown but one embodiment of my invention, and illustrated its use in sharpening the teeth of but three different types of saw blades, it will be understood that numerous changes in size, design, shape and number of the various parts may be made, that the elevation of the grinding wheel 18 with respect to the bed 20 may be altered, that additional supports for the bed may be provided, that the reciprocating mechanism may be independent of supporting bar 30 and, if desired, be located below and at the opposite side of the bed, and that the bed, i. e., bracket 65 and pillow blocks 28, may be slidably supported upon an inclined base to permit compensation for wear of the grinding wheel, all without departing from the scope of my invention as defined in the appended claims.

What I claim and desire to secure by Letters Patent is:

1. In a device of the character described, a base, an abrasive wheel, a post carried by said base, a work-supporting bed mounted on said post, means to move said post and bed relative to said wheel so as to shift the work into and out of contact with said wheel, means including a motor to actuate said last-named means, and a lever train having one end secured to said base to advance the work on said bed on alternate strokes of the latter, actuated in response to movement of said bed relative to said base.

2. In a device of the character described for sharpening a saw element, a base, a post pivoted upon a horizontal axis to said base, a bed pivoted to the upper end of said post for movement tranverse to the movement of said post relative to said base, means to lock said bed in any preadjusted tilted position on said post, means to frictionally engage said saw element on said bed, a dog to engage the teeth of said saw element to move the latter on said bed, means mounted on said base to actuate said dog in response to movement of said bed, a bar secured to said post, and means comprising a motor and a pitman connected to said bar to actuate the latter and shift said post and bed.

3. In a device of the character described for sharpening a saw element, a base, a post, means to pivot said post to said base for movement in a vertical plane, a bed pivoted on the upper end of said post and movable relative to the latter in a plane forming a right angle with the plane of movement of said post relative to said base, means to lock said bed to said post in any preadjusted angular position, a bar connected to said post extending in a plane parallel to the plane of movement of said post, means including a motor to vertically reciprocate the outer end of said bar, a dog for shifting the saw element on said bed engageable with the teeth thereof, guide means for slidably mounting said dog to said bed, a lever pivoted to said bed and to said dog having its lower end extending below said bed, a second lever fulcrumed to the underside of said bed and having one end engageable with the lower end of said first lever, a threaded rod slidably engaging with the opposite end of said second lever and connected to said base, whereby movement of said bed and post in one direction is effective to swing said second lever on its fulcrum and thereby correspondingly swing said first lever, thereby shifting said dog into operative engagement with a tooth of the saw element, and resilient means to retract said dog during movement of said post and bed in an opposite direction.

4. In a device for sharpening saw blades, a bed, a channel carried by said bed, a pair of resilient clamping members in said channel overlying one another for engagement of said blade therebetween, means to vary the positions of said clamping members in a plane transverse to the blade, and a clevis to reinforce said clamping members and forming an abutment for the back of the blade.

5. In a device for sharpening saw blades, a bed, a channel carried by said bed, a pair of resilient clamping members in said channel overlying one another for engagement of said blade therebetween, means to vary the positions of said clamping members in a plane transverse to the blade, and a clevis to reinforce said clamping members forming an abutment for the back of the blade, and screw means to vary the position of said clevis with respect to the blade.

6. In a device of the character described for sharpening a saw element, a base, a post mounted upon said base for pivotal movement in a substantially vertical plane, a bed tiltably mounted upon said post for the support of a saw element to be sharpened, means to pivotally reciprocate said post and bed, a dog for shifting the saw element on said bed, engageable with the teeth of the element, guide means for slidably mounting said dog to said bed in the plane of said element, a lever train pivoted between said base and dog to shift the latter in said guide means into operative engagement with a tooth of the saw element and correspondingly shift the element upon alternate strokes of said bed in one direction, and resilient means to retract said dog during movement of said post and bed in an opposite direction.

7. In a device of the character described for sharpening a saw element, a base, a bed, means to support said bed upon said base for tilting movement, a dog carried by said bed engageable with the teeth of said saw element for shifting the latter on said bed through a sharpening plane in a direction transverse to the tilting movement of said bed, a lever train actuated by tilting movement of said bed pivoted between said base and dog to shift the latter into operative engagement with a tooth of the saw element and correspondingly shift the element upon alternate strokes of said bed in one direction, and resilient means to retract said dog during movement of said bed in an opposite direction.

HERBERT P. DEYARMOND.

REFERENCES CITED

The following references are of record in the file of this patent:

UNITED STATES PATENTS

| Number | Name | Date |
| --- | --- | --- |
| 304,388 | Willey | Sept. 2, 1884 |
| 391,176 | Mealey | Oct. 16, 1888 |
| 506,613 | Wilbur | Oct. 10, 1893 |
| 616,305 | Fernside | Dec. 20, 1898 |
| 635,907 | Armstrong | Oct. 31, 1899 |
| 1,135,245 | Zuleg | Apr. 13, 1915 |
| 1,813,825 | Stauder | July 7, 1931 |
| 1,831,204 | Stauder | Nov. 10, 1931 |
| 2,060,319 | Hughes | Nov. 10, 1936 |
| 2,067,179 | Elder | Jan. 12, 1937 |
| 2,161,947 | Bower | June 13, 1939 |
| 2,229,644 | Elder | Jan. 28, 1941 |
| 2,347,087 | Deyarmond | Apr. 18, 1944 |

FOREIGN PATENTS

| Number | Country | Date |
| --- | --- | --- |
| 359,576 | Germany | Sept. 23, 1922 |